(12) United States Patent
Folkvang

(10) Patent No.: US 8,110,024 B2
(45) Date of Patent: Feb. 7, 2012

(54) SEPARATOR TANK FOR SEPARATION OF FLUID COMPRISING WATER, OIL AND GAS, USE OF SUCH A TANK, AND METHOD FOR SEPARATING A FLUID INCLUDING WATER, OIL, AND GAS

(75) Inventor: Jorn Folkvang, Stathelle (NO)

(73) Assignee: Schlumberger Norge AS, Stavanger (NO)

( * ) Notice: Subject to any disclaimer, the term of this patent is extended or adjusted under 35 U.S.C. 154(b) by 283 days.

(21) Appl. No.: 12/084,143

(22) PCT Filed: Oct. 27, 2006

(86) PCT No.: PCT/IB2006/053981
§ 371 (c)(1),
(2), (4) Date: Mar. 24, 2010

(87) PCT Pub. No.: WO2007/049247
PCT Pub. Date: May 3, 2007

(65) Prior Publication Data
US 2010/0180768 A1 Jul. 22, 2010

(30) Foreign Application Priority Data
Oct. 28, 2005 (EP) .................................... 05388092

(51) Int. Cl.
*B01D 19/00* (2006.01)
(52) U.S. Cl. ............... 95/243; 95/253; 96/182; 96/183; 96/212; 210/788; 210/512.2; 210/512.1
(58) Field of Classification Search .................... 95/243, 95/245, 258, 261, 253, 259; 96/182, 183, 96/185, 186, 202, 209, 210, 211, 212; 210/788, 210/512.2, 512.1
See application file for complete search history.

(56) References Cited

U.S. PATENT DOCUMENTS

| 2,719,631 | A | | 10/1955 | Vicard |
| 3,386,588 | A | * | 6/1968 | Ades ........................ 210/512.2 |
| 4,149,861 | A | * | 4/1979 | Sogo et al. ..................... 96/372 |
| 4,203,961 | A | * | 5/1980 | Cowley ......................... 423/478 |
| 4,273,563 | A | * | 6/1981 | Fadda et al. ..................... 96/209 |
| 4,424,068 | A | | 1/1984 | McMillan |
| 4,428,839 | A | * | 1/1984 | Davies et al. ................... 95/253 |
| 5,570,744 | A | | 11/1996 | Weingarten et al. |
| 2004/0211734 | A1 | | 10/2004 | Moya |

FOREIGN PATENT DOCUMENTS

| GB | 773414 | 4/1957 |
| GB | 2 000 054 A | 1/1979 |
| WO | WO 99/20873 | 4/1999 |
| WO | WO 2005079946 A1 * | 9/2005 |

* cited by examiner

*Primary Examiner* — Duane Smith
*Assistant Examiner* — Douglas Theisen
(74) *Attorney, Agent, or Firm* — Jacobson Holman PLLC

(57) ABSTRACT

A separator tank (1) comprising an essentially cylindrical vertical tank, a tangentially arranged inlet (3) in an upper part (9) of the tank, at least one first outlet (4) for oil and gas in the upper part of the tank, and at least one second outlet (5) for water in a lower part of the tank. A vortex zone (7) comprises a downward protruding conical frusta shaped wall (8) with an opening (11) at the lower end to allow communication between the upper and lower part of the tank. A helical spiralling vane is disposed on the upward directed part of said conical frusta shaped wall.

26 Claims, 5 Drawing Sheets

Figure 1:
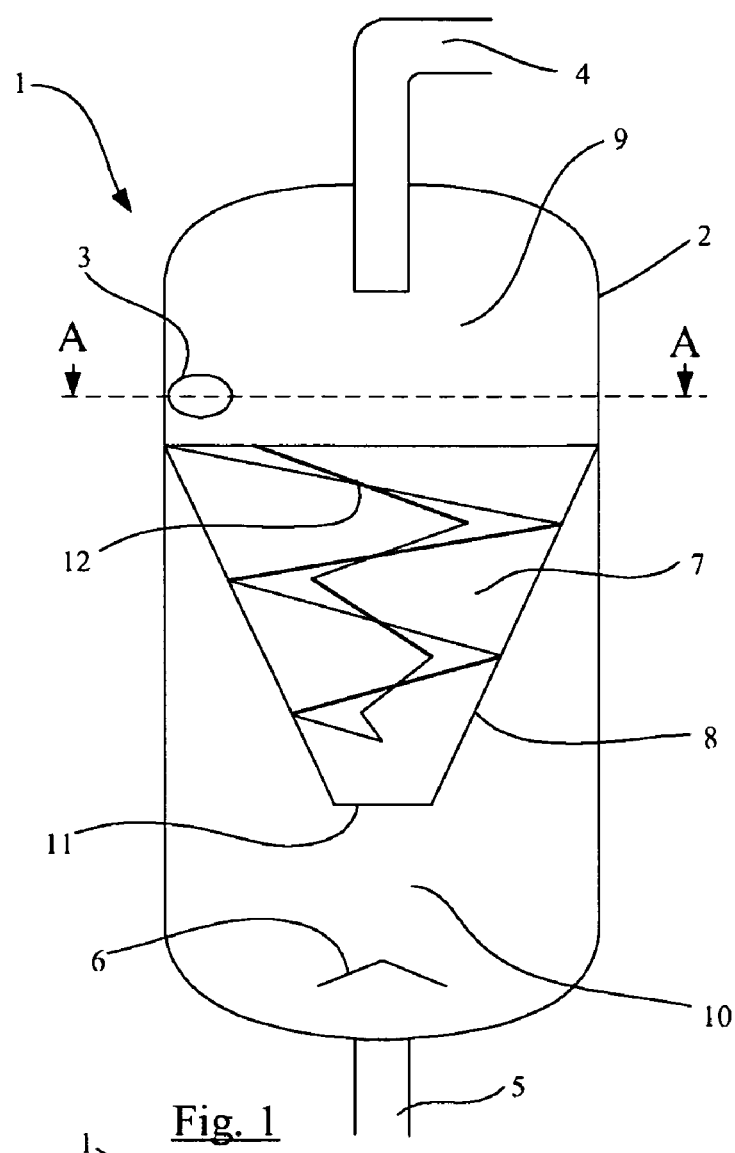

SEPARATOR TANK FOR SEPARATION OF FLUID COMPRISING WATER, OIL AND GAS, USE OF SUCH A TANK, AND METHOD FOR SEPARATING A FLUID INCLUDING WATER, OIL, AND GAS

CROSS-REFERENCE TO RELATED APPLICATION

This is a national stage of PCT/IB06/053981 filed Oct. 27, 2006 and published in English.

The invention relates to a separator tank for separation of a fluid comprising water, oil and gas.

In the oil industry the production of crude oil involves a mixture of oil, gas and water from subterranean reservoirs. At the well head an initial separation usually takes place in one or more stages to remove additional water and gas before the crude oil is ready to be discharged for export.

After the initial separation the crude oil and the gas may be further purified prior to discharge for refining etc. After further purification water and sand is usually optionally discharged into a suitable recipient such as the sea or into a reservoir.

When maturing oil and gas fields it is often found that the volume of water accompanying the oil and gas becomes much larger and, consequently, the larger volumes of produced water must be treated at the well head production facility in order to maintain an acceptable production rate.

Further, there is general concern as to the pollution caused by oil production at sea, particularly when the oil production takes place in areas that are considered environmentally fragile, such as arctic areas or fishing areas. In the oil industry there is a fear that demand for a significantly lower outlet limit for oil would make oil production from a number of known reservoirs uneconomical if they have to rely on the equipment used at present. Thus, great efforts have been made by the industry and authorities to find ways to reduce the outlet of oil during oil production at affordable prices.

On oil and gas production platforms intended for operation offshore limited space is usually available. Therefore there are very strict constraints on the space available for installation of equipment. An even stricter constraint on space may be encountered if the establishment of production and separation at the sea bed level is considered.

In the prior art a number of oil-gas-water separators are known. In U.S. Pat. No. 4,424,068 a separator and a method for separating a mixture of oil, gas and water, such as may be received from an oil-well, is described. The separator is in the form of a vessel divided into separation chambers and provided with a number of baffles and a dynamic separator where the incoming mixture changes direction several times. Despite the fact that the separator has been known for several years, it seems not to have been widely used. Further, as the separator comprises several chambers and many parts, the maintenance will be time consuming which may lead to a costly stop of oil production.

WO 99/20873 describes a sand trap that may be placed on an oil well in order to remove heavier particles such as sand before further processing of the crude oil. The device has a mouth facing a relatively narrow part of the tank with a spatial connection facing a relatively widened part of the tank where sand and heavy particles precipitate.

GB 2000054 A discloses a separator in which crude oil is separated into liquid and gas in a vessel having a feed inlet disposed tangentially so that a downward flowing helix of liquid and an upward flowing helix of gas are formed. The vessel has an upper outlet for gas comprising a pipe extending downward into the vessel from the top thereof. The lower end of the vessel, which is conical, is provided with baffles to slow down the helix of liquid and opens into a disengaging chamber for gas still present in the liquid; the gas being vented at and the liquid being discharged over a weir.

Despite the number of known oil-gas-water separators there is still a need for an oil-gas-water separator with improved phase separation capacity, which only requires a minimum of space, which can be continuously operated with a low maintenance requirement and which can be manufactured and operated at moderate price.

An object of the present invention is to provide a separator with high capacity compared to volume.

Consequently, the present invention relates to a separator tank comprising an essentially cylindrical vertical tank, a tangentially arranged inlet in an upper part of the tank, at least one first outlet in the upper part of the tank, at least one second outlet in the lower part of the tank, means for establishing a calm stream around the second outlet, and a vortex zone located below the tangentially arranged inlet and above the second outlet, wherein said vortex zone comprises a downward protruding conical frusta shaped wall dividing the tank into said upper part and said lower part and having an opening at the lower end of said downward protruding conical frusta shaped wall to allow communication between the upper and lower part of the tank, and a helical spiralling vane disposed at and secured to the upwards directed part of said conical frusta shaped wall. Preferably the first outlet is for oil and gas and the second outlet is for water.

The separator tank according to the invention provides a highly efficient separator for fluids comprising water, oil and gas. The unique design of the vortex zone comprising the protruding conical frusta wall with a helical spiralling vane co-operating with the tangentially arranged inlet promotes formation of a vortex flow in the separator tank, which provides for an excellent separation of the oil and the gas phase from the water phase. The oil and gas phase will rise faster and more selective to the top of the tank and the water phase will in a similar manner, flow faster and more selective towards the bottom of the tank.

The first outlet in the upper part of the tank may be arranged to have an ejecting effect. This ejecting effect is achieved by pressure build-up by gas in the upper part of the tank. In particular when the outlet for oil and gas extends a distance (e.g. a distance in the range of 5-30 cm) down into the tank to an outlet opening, gas from the mixture comprising water, oil and gas may accumulate in the space in the upper part of the tank defined by the top of the tank and the location of the outlet opening to the first outlet. In such an arrangement a pressure build-up will take place by accumulation of gas until the gas has displaced the liquid part of the mixture in the tank to a level just below the outlet opening to the first outlet. At this point gas and oil will be ejected through the first outlet and leave the tank. The level of the liquid mixture will rise to above the opening to the first outlet, and a new pressure build-up will take place. In this manner oil is automatically skimmed from the top of the water in the tank. Depending on the location of the outlet opening to the first outlet, the pressure build-up and rejection may take place in less than one second.

For the purpose of improving the flow in the separator, it is preferred that the angle between the wall of the vertical tank and the protruding conical frusta shaped wall is in the range between 15 degrees and 45 degrees, more preferably between 25 degrees and 35 degrees, most preferably 30 degrees. Using these preferred angles makes it possible to provide a very efficient flow for phase separation in the separator tank, as the shape of the vortex can be optimised.

According to the invention, it is preferred that the separator tank further comprises means for gas injection. The gas may be injected into the fluid in the tank via one or more nozzles provided in the upper part and/or lower part of the tank. The injected gas forms small bubbles, which facilitate the separation of the oil/gas phase from the water phase by the formation of an upward flow of gas bubbles.

In an alternative, preferred embodiment of the separator tank, the means for gas injection are provided at the tangentially arranged inlet, whereby the gas is injected into the incoming fluid in the tank. Subsequently, the gas forms small bubbles in the fluid that promote separation. The gas used for gas injection may be any gas suitable for forming bubbles in the fluid, e.g. $CO_2$, nitrogen or a gas based on hydro-carbons, preferably the gas is recycled gas from a water/oil/gas separation. The amount of gas added is typically in the range of 0.02 to 0.2 $St.m^3$ per 1 $m^3$ of fluid. Values in the range of 0.05 to 0.18 $St.m^3$ per 1 $m^3$ of fluid are preferred, but higher values for the amount of gas added can also be used, such as an amount of up to 0.3 $St.m^3$ per 1 $m^3$ of fluid. $St.m^3$ is standard cubic meters of the gaseous medium. $St.m^3$ is standardised within the offshore field (volume of dry gas at 15.6° C. and a pressure of 101.325 kPa).

Using gas from an external source has several disadvantages. The supply of gas has to be maintained, and the gas is to some extent consumed so that new gas supplies have to be obtained at intervals. And the systems on the downstream side of the separator tank have to handle the additional flow caused by added gas.

In a preferred embodiment the gas source for the means for gas injection is a gas zone in the upper part of the separator tank. Gas separated out from the inlet fluid is consequently used as a source for gas to be added to the inlet fluid, and in this manner savings in external gas supplies are obtained. In a even more preferred embodiment the gas zone in the upper part of the separator tank is the sole gas source for the means for gas injection. This makes it possible to completely dispense with installing external supplies for gas, and the separator tank system thus has a more simple design.

In a further embodiment a conduit from the gas zone in the upper part of the tank is connected to an eductor in the inlet to the same tank. The eductor has the advantage of no moving parts and thus high reliability. The reliability of the separator tank as such is consequently improved in comparison to an embodiment using external supply of gas, also because the fluid, such as produced water, automatically provides the supply of gas.

In yet an embodiment the conduit from the gas zone in the upper part of the tank is in open direct flow connection with the eductor in the inlet to the same tank, during operation of the tank. There is consequently no pump in said conduit. A flow indicator can be provided in the conduit but that does not prevent the open direct flow connection. The means for gas injection embodied in this manner are completely self-sustained and automatically operating at very high reliability.

In a preferred embodiment of the separator tank according to the invention, the helical spiralling vane has at least two full 360 degree twists to ensure satisfactory vortex formation and thus improved separation.

Furthermore, for the purpose of improving the separation capacity, the helical spiralling vane preferably has a width in the range from 5 to 15 cm.

In order to obtain the best possible separation in the separator tank, it is preferred that the tank has at least one third outlet for oil and gas, which third outlet is preferably located in the tank wall below the protrusion of the protruding conical frusta shaped wall, the protrusion being the location where conical frusta shaped wall contacts the tank wall. At this location the conical frusta shaped wall has its largest diameter and is fixed to the tank wall, such as by welding. Oil and gas can be taken out in the upper part of the tank through the first outlet and also in the lower part of the tank through the third outlet, leading to a very efficient separation. The third outlet for oil and gas is preferably located just below the upper end of the protruding conical frusta shaped wall, which is the highest place in the lower part of the tank that the fluid to be separated can reach. In a preferred embodiment the third outlet is connected to the upper part of the tank. In this embodiment the oil and gas separated from water in the lower part of the tank is then led to the upper part of the tank and leaves the tank via the first outlet for oil and gas in the upper part of the tank.

To further improve the separation in the lower part of the separator tank it is desirable to establish a second vortex flow in the lower part of the tank. Consequently, the tank is equipped with means for providing an upward vortex flow in the lower part of the tank, in such a manner that the upward vortex flow preferably encircles the downward directed wall part of the protruding conical frusta shaped wall. The second vortex flow in the lower part of the tank provides for an efficient separation of possible residual oil and gas left in the water phase subsequent to the separation step in the upper part of the tank. The oil and gas optionally separated from the water phase in the lower part of the tank may be taken out via the third outlet for oil and gas described above. The water phase leaves the tank via the second outlet located in the bottom part of the tank. The water phase may comprise solids and particulate materials present in the fluid to be separated. These solids and particulate materials normally leave the separator tank with the water phase. However, in an optional embodiment the separator tank is equipped with a separate outlet for solids. This optional embodiment may be advantageous when the fluid comprises larger amounts of solids and particulate material.

Although the means for providing an upward vortex flow may comprise a wide range of means to direct a fluid in a certain direction, it is preferred that the means are at least one baffle or guide vane.

In a further aspect, the invention also relates to a method for separating a fluid comprising water, oil and gas, which method comprises the steps of:

a) feeding the fluid containing water, oil and gas to be treated into a tangentially arranged inlet of a first separator tank of the above-mentioned type; thereby causing fluid flow into a lower part of the tank via a downward protruding conical frusta shaped wall with a helical spiralling vane, b) taking out a stream of oil and gas from at least one first outlet of the first tank, and subjecting said stream of oil and gas to a further separation in a second separation tank of the above-mentioned type to obtain an oil stream through at least one second outlet of the second tank and a first gas stream through at least one first outlet of the second tank;

c) taking out a first stream of water from at least one second outlet water of the first tank, and feeding said stream of water through a tangentially arranged inlet to a third tank of the above-mentioned type thereby causing fluid flow into a lower part of the tank via a downward protruding conical frusta shaped wall with a helical spiralling vane, and d) taking out a stream of cleaned water through at least one second outlet of the third tank. The stream of cleaned water contains less than 20 ppm impurities, and may contain less than 15 ppm impurities, or even less than 10 ppm impurities.

The method makes is possible to separate the stream of cleaned water from the other constituents of the fluid comprising water, oil and gas, and if desired to separate the fluid into all these constituents, i.e. into a water phase, an oil phase and a gas phase. Moreover, the separated phases have a high degree of purity. The oil phase and the gas phase can be discharged for use or further treatment, and the stream of cleaned water phase can be returned to the environment, e.g. the sea or the reservoir. The water phase may comprise some solid material like sand and other particles, which, if desired, can easily be removed with a filter or by precipitation.

The method according to the present invention is advantageous in several aspects. The separator tanks utilized in the method have no moving parts, and they are highly robust to processing fluid, such as well fluid, of varying compositions. And the method is efficient in cleaning the water also when the fluid contains a large proportion of water. The method is consequently well suited to prolong the productive life of matured oil and gas fields where the water content is high in the fluid stream from the well head, typically because water has been injected into the reservoir for years while oil has been produced.

In a preferred embodiment of the method, the fluid or liquid in the first tank and/or second tank and/or third tank is subjected to gas injection. Thus, gas injection may be applied in only one of the separation tanks, in two of the separation tanks, or in all of the separation tanks. Gas injection may, therefore, be applied in any desired way in order to facilitate separation.

The gas injection is preferably performed in the inlet to the tank and, more preferably, the means for gas injection are located in the inlet pipe in close vicinity to the inlet. The nozzle for injection may in this case be a ring shaped type. The gas to be injected is optionally recycled gas from the separation process. The injected gas facilitates the flotation process separating the water from the gas. As the best results are achieved when the gas is dispersed in the fluid as tiny bubbles, it is preferred that the gas is injected into the fluid in the inlet duct via a nozzle device located only a short distance from the inlet opening to avoid the tiny gas bubbles merging to form bigger gas bubbles which do not have the same efficiency.

In a further aspect, the invention also relates to the use of a separator tank comprising an essentially cylindrical vertical tank, a tangentially arranged inlet, at least one first outlet for oil and gas in the upper part of the tank, at least one second outlet for water in the lower part of the tank, means for establishing a calm stream around the second outlet, and a vortex zone located below the tangentially arranged inlet and above the second outlet, wherein said vortex zone comprises a downward protruding conical frusta shaped wall dividing the tank in an upper part and a lower part with an opening at the lower end of said downward protruding conical frusta shaped wall to allow communication between the upper and lower part of the tank, and a helical spiralling vane disposed at and secured to the upwards directed part of said conical frusta shaped wall, for separating a fluid comprising water, oil and gas, preferably into these constituents.

The separator tank or tanks may e.g. be used on fluid from the main stream from the well head, or on a partial stream diverted or separated from the main stream, or in an intermediate cleaning step of a water stream containing smaller amounts of oil and gas, or e.g. be used in a final cleaning step of such a water stream, or the separator tank can be used on a partial stream thereof, and possibly on a partial stream from another separator. In any case the water, oil and gas originate from a well head and are as such in the present context considered well fluids irrespective of where in the production facility the separator is actually used to separate a stream of fluid.

Use of two or more separator tanks may be preferred to obtain a better phase separation. The two or more separator tanks may be used in series, or the two or more separator tanks may be used in parallel. A further possibility is to use separator tanks both in series and in parallel. How the separator tanks should be connected depends on the situation. In any case, this will be a matter a skilled person can deal with as a matter of routine.

In a preferred embodiment one or more separator tanks according to the invention are used for separation of well fluid originating from a well head in oil and gas production. The well fluid fed to the separator tanks is typically a water-rich waste stream separated off from the well stream delivered by the well head. Such an initially separation into an oil/gas-rich phase and a water-rich phase can occur in one or more separation steps.

The use also includes an embodiment wherein the fluid is initially separated into an oil/gas phase and a water phase.

The use further includes an embodiment wherein the oil/gas phase is separated into an oil phase and a gas phase in an additional separation step.

Figure 2:
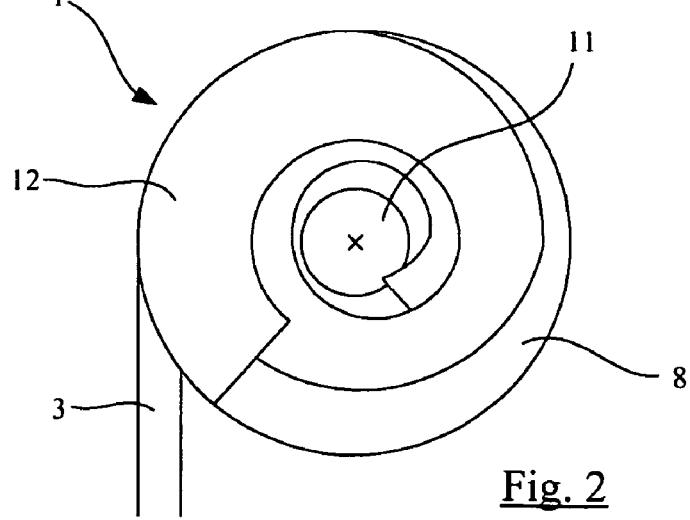
Figure 3:
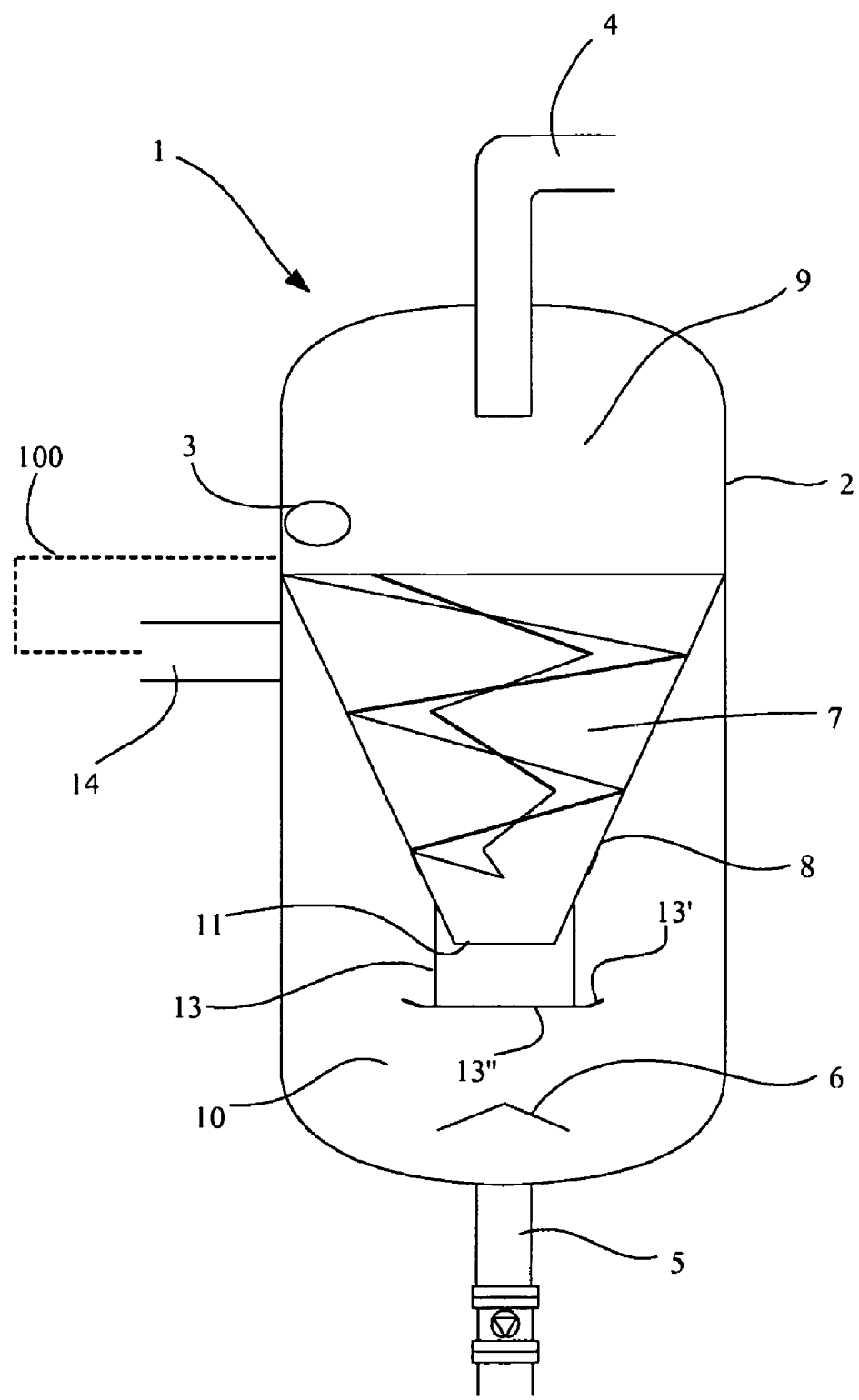
Figure 4:
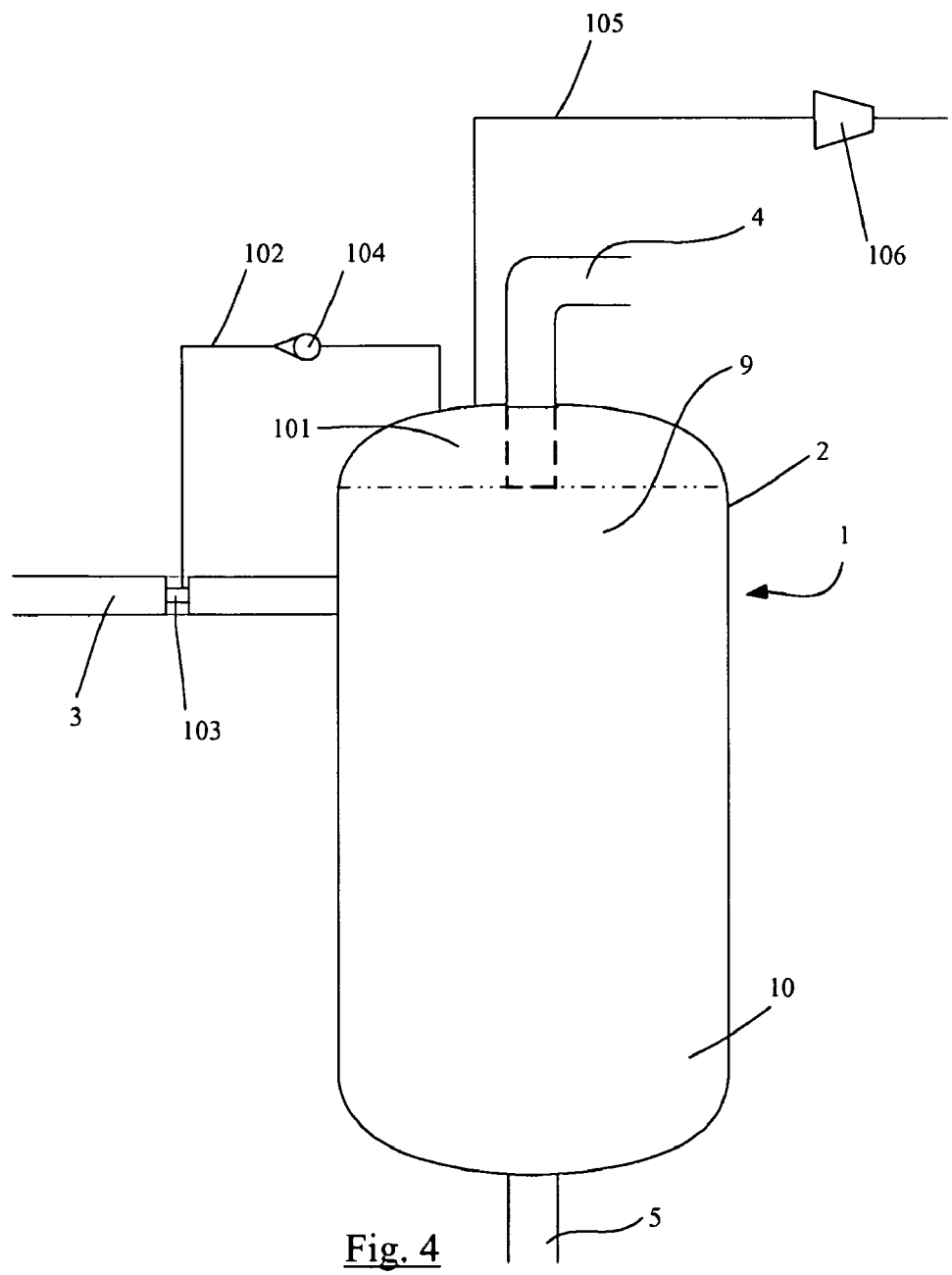
Figure 5:
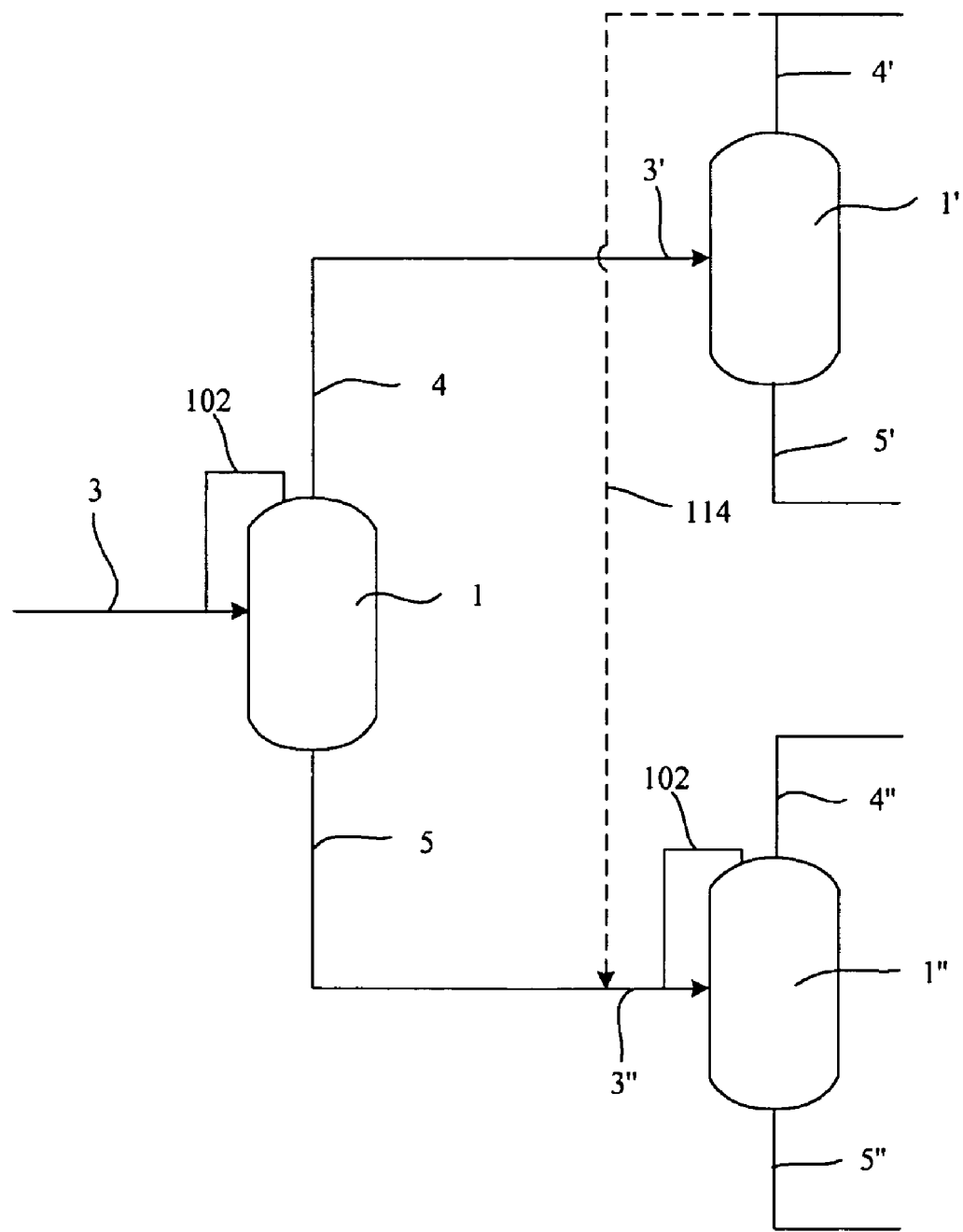
Figure 6:
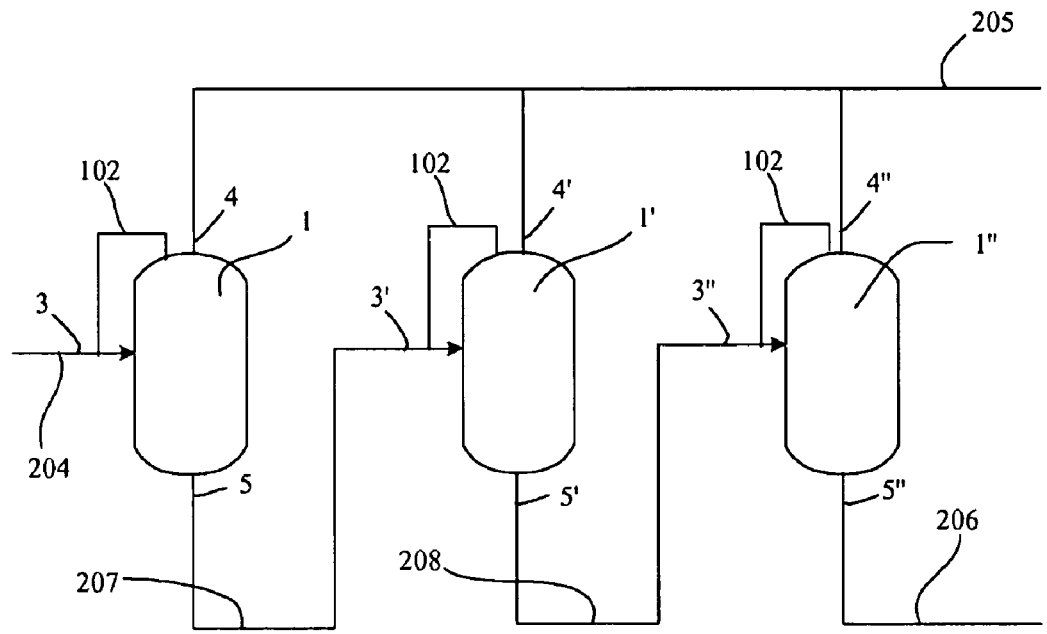
Figure 7:
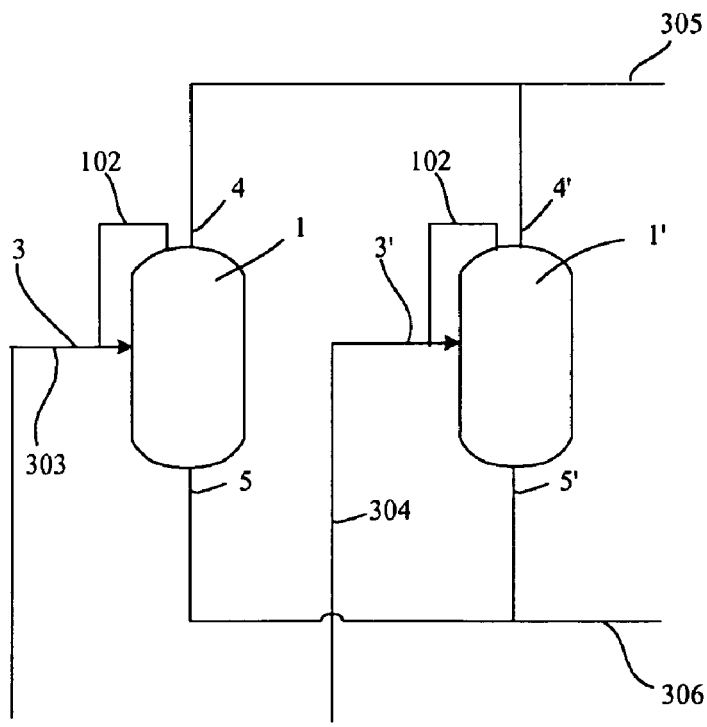

In the following, illustrative, non-limiting examples of embodiments of the invention will be described in further detail with reference to the highly schematic drawings in which:

FIG. 1 depicts schematically a sectional side view of an embodiment of a separator tank according to the present invention, FIG. 2 depicts a sectional top view of the separator tank in FIG. 1, FIG. 3 depicts a view like FIG. 1 of another embodiment of the separator tank according to the present invention, FIG. 4 depicts a further embodiment according to the present invention, FIG. 5 depicts an arrangement where three separator tanks according to the invention are used for separating a fluid comprising oil, gas and water, FIG. 6 depicts an arrangement where separator tanks according to the invention are used in series, and FIG. 7 depicts an arrangement where separator tanks according to the invention are used in parallel.

FIG. 1 depicts an embodiment of a separator tank generally designated 1 and comprising a cylindrical vertical tank 2, a tangentially arranged inlet 3 for fluid, such as a well fluid or another mixture comprising water, oil and gas. Inlet 3 extends to an inlet opening in the wall of the tank. The separator tank further comprises a first outlet 4, typically for oil and gas, in an upper part 9 of the tank, and a second outlet 5, typically for water, in a lower part 10 of the tank.

A vortex zone 7 is located below the tangentially arranged inlet 3 and above the second outlet 5. The vortex zone 7 comprises a downward protruding conical frusta shaped wall 8 dividing the tank into the upper part 9 and the lower part 10. An opening 11 is provided at the lower end of the downward protruding conical frusta shaped wall 8 in order to allow fluid communication between the upper part 9 and the lower part 10 of the tank 1. A helical spiralling vane 12 is disposed and secured to the upward directed part of said conical frusta shaped wall 8.

The downward protruding conical frusta shaped wall 8 has its largest diameter at the upper end and its smallest diameter at the rim of the opening 11 at the lower end. The largest diameter at the upper end of wall 8 corresponds to the inner diameter of the circular cylindrical sidewall of the tank, and at this largest diameter the wall 8 is mounted to the sidewall of the tank, such as by a weld joint or other means of mounting such as a flange bolted to the wall of the tank.

The means for calming a flow around the second outlet can be a baffle 6 provided in order to calming liquid movements in vicinity of the second outlet so that there may be established a more calm stream around the second outlet 5. The baffle 6 can e.g. be fixed to the tank wall by use of two or more flat bars extending downwards to the curved bottom as legs, or be fixed by two or more stiffeners (stays) extending to the vertical portion of the tank wall, of be fixed by a single vertical support extending upwards from the area of the pipe portion forming second outlet 5. The means for calming a flow around the second outlet (for water or for oil) can be embodied as a disc with a circular circumference optionally placed horizontally just above the second outlet. As an alternative the means for calming the flow around the second outlet may have a conical shape or a hemispherical shape.

The outlet for water 5 may be equipped with valve means (illustrated in FIG. 3). By adjusting this valve means the pressure build-up by gas released from the mixture in the tank 1 can be adjusted. The gas released from the mixture is collected in the upper part of the tank 9. The more gas that is collected the higher the pressure becomes. As the pressure of the gas increases, the gas displaces the liquid mixture in the tank 1. When the collected gas has displaced the liquid mixture to a level below the outlet opening in outlet 4 for gas and oil, gas and oil are ejected out of the tank via the outlet 4 due to gas pressure.

The separator tank 1 is a well fluid separator tank, and the liquid mixture may originate from a fluid stream of the well head or it may originate from a branch stream of such a fluid stream, or from a stream separated of from any such streams.

FIG. 2 depicts the separator tank 1 in a sectional view along dashed line AA in FIG. 1. Using the same reference numbers as in FIG. 1, the tangentially arranged inlet 3, the downward protruding conical frusta shaped wall 8, the helical spiralling vane 12 and the opening 11 can be seen.

In FIG. 3, a further embodiment of the separator tank 1 is depicted. This embodiment of the separator tank 1 comprises all the features of the tank depicted in FIG. 1 (indicated with the same reference numbers) and is further equipped with a guiding plate 13" and a further outlet 14 for oil and gas. Guiding plate 13" may e.g. be a circular plate with a larger diameter than opening 11 and mounted to the lower side of conical frusta shaped wall 8 via a few vertical suspension rods 13 or stays. Guiding plate 13" extends across opening 11 at a distance from the opening so that fluid flowing down and out through opening 11 impinges on guiding plate 13" and flows outwards in radial direction through the annular space between guiding plate 13" and the rim of opening 11. The edge area 13' of guiding plate 13" can be extend obliquely upwards and outwards so that the fluid flow is directed upwards. The guiding plate 13 is arranged to provide a vortex flow in the lower part of the tank 10 of the fluid coming from the upper part 9 of the tank into the lower part 10 so as to provide a further separation in which an oil and gas phase separated from a water phase can be taken out of the tank 1 via the further outlet 14.

The further outlet 14 can lead oil and gas to a reject outlet like the one the first outlet 4 is connected with. Alternatively, the further outlet can be connected to inlet 3 via a non-return valve and an eductor mounted in the conduit of inlet 3, but preferably a conduit 100 connects the further outlet 14 with the upper part 9 of the tank via a further inlet opening in the wall of the tank. An advantage of this embodiment is simplicity of design because only a short conduit 100 is necessary for delivering oil and gas from the lower part of the tank to the upper part of the tank.

Gas can be injected into the fluid flowing through inlet 3. In one embodiment (not illustrated) gas, such as nitrogen or fuel gas, is supplied to inlet 3 from an external source. In a preferred embodiment illustrated in FIG. 4 gas is taken out from a gas zone 101 in the upper part 9 of the separator tank. The gas flows from gas zone 101 through conduit 102 and into an eductor 103 mounted in inlet 3 to tank 1. The eductor is embodied as a conduit part having a short length and having a smaller cross-sectional area than the adjacent conduit parts forming inlet 3. Due to the reduced area the velocity is higher in the fluid flow through the eductor than in the adjacent parts of the inlet, and as a result the fluid pressure in the eductor is relatively low so that gas is sucked from conduit 102 into the fluid flowing through the eductor.

Conduit 102 is provided with a flow indicator 104 or flow sensor, which does not prevent the eductor from being in open direct flow connection with gas zone 101 when the separator tank is operating. Gas zone 101 also communicates with an gas outlet line 105 provided with a compressor 106 to increase the pressure in the outlet gas. In the embodiment illustrated in FIG. 4 the means for gas injection to the inlet of the separator tank are completely self-sustained and automatically operating.

The embodiment of FIG. 4 has an additional advantage in the gas system is in flow balance in the sense that the surplus gas taken out through gas outlet line 105 corresponds to the difference between the gas supplied with the fluid inflow through inlet 3 and the gas leaving through outlet 4. The flow of gas into the tank is larger, and preferably much larger, such as at least 50% larger or 100% larger, than the aggregate gas flow out of first outlet 4 and gas outlet line 105.

In another embodiment the gas injection is performed in the inlet to the tank, and the means for gas injection are located in the inlet pipe in close vicinity to the inlet. The nozzle for injection may in this case be of a ring shaped type.

The separator tank according to the invention is usually operated at a pressure determined mainly by the pressure with which the fluid leaves the well head, however the pressure may also be increased or reduced before entering the separator tank using known procedures. The separator tank may be operated at a pressure corresponding to atmospheric pressure and upwards.

The dimensions of the separator may be selected according to the amounts of fluid intended to be treated. In operation it has been found that the residence time in the tank for a fluid to be treated should be from about 20 seconds and upwards, preferably the residence time is in the range of 20 to 300 seconds, more preferably 25 to 240 seconds.

For the separation tank according to the invention an efficient separation volume may be calculated as the volume of the space bounded by the tank 1 and the height of the liquid in the tank. Based on the residence time the capacity of the tank may be calculated, e.g. a tank with an efficient separation volume of 1 $m^3$ and a residence time for the liquid of about 30 seconds has a capacity for treating about 100 $m^3$ fluid per hour.

The ratio of height to diameter of the tank can be selected within wide limits preferably in the range of 1:1 to 4:1 more preferably from 1:1 to 2:1. It is within the abilities of a person skilled in the art to select materials used for the construction of the tank based on the actual conditions for the intended use, such as the amounts of liquid to be treated, the composition of said liquid, the selected pressure, the temperature of the liquid and the presence of possibly corrosive chemicals in any of the phases of the mixture.

During operation, the rate with which the separated phases are withdrawn via the respective outlets determines where the inter-phases between gas and oil, oil and water and water and solids are located in the tank. The skilled person will appreciate how to adjust the rate of withdrawal via the respective outlets so that the optimal separation will be achieved.

Because of the way the separator tank according to the invention is constructed with all surfaces vertical or having a steep inclination except for guide vane and vortex breaker and no narrow passages in the tank, there is no place in the separator, which is susceptible to clogging or deposition of solid materials. Therefore the initial separation of the fluid at the well head may be performed essentially continuously without or only with a minimal need for maintenance of the separator tank.

Further maintenance, when it is necessary even though it is infrequent, can easily be performed due to the well-thought-out design of the separator tank.

Thus the separation of the fluid at the well head or in the well stream according to the invention has a remarkable robustness, i.e. it can be run for long periods without interruptions, and the few stops that may be required for maintenance can be made short.

The high capacity combined with the minimum space requirements and the robustness of the separation tank according to the invention makes it particularly suited for use at off-shore installations such as oil and gas production platforms. Furthermore, it is also well suited for use in oil and gas production located on the sea bed, because at such a location the constraints on space may be even stricter than on traditional oil and gas production platforms and the capacity for maintenance may be lower. The separator tank is highly useful in oil and gas production both on-shore and off-shore.

Now the invention will be further illustrated by examples, which should not be regarded as limiting the invention.

EXAMPLES

1. Use of Three Separator Tanks According to the Invention as Separators for Three Phase Separation With reference to FIG. 5 use of separation tanks for separating a well stream comprising oil, gas and water is schematically depicted.

The use includes three separator tanks 1, 1' and 1" according to the invention. The first outlet 4 of tank 1 is for oil and gas and is connected to the inlet 3' on tank 1'. Likewise the second outlet 5 of tank 1 is for water (with minor amounts of oil and gas) and is connected to the inlet 3" on tank 1".

The well fluid separated from the well head is led into tank 1 via inlet 3. In tank 1 the fluid is separated into a gas and oil phase and a water phase. The gas and oil phase is taken out from tank 1 via first outlet 4 and led to tank 1' via inlet 3'. The water phase (with minor amounts of oil and gas) is taken out from tank 1 via second outlet 5 and led to tank 1" via inlet 3".

In tank 1' the gas and oil phase is separated into gas, which leaves tank 1' via first outlet 4', and oil, which leaves tank 1' via second outlet 5'.

In tank 1" the water phase is separated into water and oil/gas. The oil/gas leaves tank 1" via first outlet 4" and the water leaves tank 1" via outlet 5".

In order to improve the separation in tank 1" further gas may be injected into the incoming stream from the second outlet 5. The gas for injection may be a part of the recovered gas from first outlet 4', as indicated by the broken line 114.

The two tanks 1 and 1" are provided with a conduit 102 connecting the gas zone in the tank with an eductor in the inlet 3 and inlet 3", respectively. Optionally tank 1' may also be provided with such a conduit 102.

By the described arrangement a fluid from a well head comprising oil, gas and water is very effectively separated into an oil phase, a gas phase and a water phase, where the stream of cleaned water leaving tank 1" via line 5" contains less than 10 ppm impurities.

2. Use of Three Separator Tanks According to the Invention as Separators in Series FIG. 6 schematically depicts three tanks 1, 1', and 1" connected in series for separating a well stream 204 from a well head into an oil/gas phase 205 and a water phase 206. The well stream 204 may e.g. be water comprising 1000 ppm of impurities (gas/oil). Subsequent to treatment in tank 1 the water stream in line 207 from the second outlet 5 comprises 100 ppm impurities. The stream 207 is led to inlet 3' for treatment in tank 1', and the water stream 208 from the second outlet 5' from tank 1' comprises 10 ppm impurities. The stream 208 is finally fed to inlet 3" for treatment in tank 1", thus providing a water stream 206 from the second outlet 5" with less than 5 ppm impurities.

The tanks 1, 1' and 1" are provided with a conduit 102 connecting the gas zone in the tank with an eductor in the inlet 3, inlet 3', and inlet 3", respectively.

This arrangement may optionally be used for further treatment of the water stream from the second outlet 5" from tank 1" in the tank arrangement illustrated in FIG. 5 (Example 1). The oil/gas phase may be separated into oil and gas by treatment in a further tank as described in Example 1. Optionally the oil/gas phase may be separated in two or more tanks in series.

3. Use of Separator Tanks According to the Invention as Separators in Parallel

FIG. 7 schematically depicts an arrangement where two tanks 1 and 1' are used in parallel. Well fluid from well head part streams 303 and 304 enters tanks 1 and 1' at inlets 3, 3. An oil/gas phase is taken out at 305 and a water phase is taken out at 306. The oil/gas phase and the water phase may be further treated as described in Examples 1 and 2.

The tanks 1 and 1' are provided with a conduit 102 connecting the gas zone in the tank with an eductor in the inlet 3 and inlet 3', respectively.

Turning now to the more general description it is clear that FIGS. 1 to 7 are only schematical and the arrangements may comprise further equipment normally used in oil and gas production e.g. valves, pumps, compressors, further pipelines, which are excluded for simplicity. However, the arrangement described above can easily be adapted for specific use by a skilled person.

Moreover, it is evident that the separator tanks according to the invention can be used in combination in any desired arrangement, e.g. in series and/or in parallel. The well fluid separator tanks and the method and the use according to the present invention can be modified within the scope of the appended patent claims. Details of the various embodiments can be combined into new embodiments within the scope of the patent claims. It is e.g. possible to provide an individual tank with two or more first outlets and/or with two or more second outlets and/or with two or more inlets. The first outlet can be provided with a valve, and both the first outlet and the second outlet can be provided with a valve. The first outlet and/or the second outlet can be mounted at other locations than coaxial with the vertical centre line of the tank, such as parallel with said centre line, but at a distance from the centre line. The eductor used in the inlet can be replaced with another mixing device for mixing gas and fluid, or with a mixing device in the inlet in combination with a pump in conduit 102 for withdrawing the gas from the gas zone. Such an embodiments is however less favourable because it is more complicated and not like the embodiment of FIG. 4 an automatic, self-regulating system which is independent from outside supplies and has no moving parts. The system illustrated in FIG. 4 for taking out gas from a gas zone 101 in the upper part 9 of the separator tank and feeding the gas to the inlet of the same tank may be used also in connection with separator tanks of other designs that the design illustrated on FIGS. 1-3 and claimed in claim 1.

The invention claimed is:

1. A separator tank comprising an essentially cylindrical vertical tank, a tangentially arranged inlet in an upper part of the tank, at least one first outlet in the upper part of the tank, at least one second outlet in a lower part of the tank, means for establishing a calm stream around the second outlet, and a vortex zone located below the tangentially arranged inlet and above the outlet for water, wherein said vortex zone comprises a downward protruding conical frusta shaped wall dividing the tank into said upper part and said lower part and having an opening at the lower end of said downward protruding conical frusta shaped wall to allow communication between the upper and lower part of the tank, and a helical spiralling vane disposed at and secured to the upward directed part of said conical frusta shaped wall.

2. The separator tank according to claim 1, wherein the angle between the wall of the vertical tank and the protruding conical frusta shaped wall is in one of the following two ranges: the range between 15 degrees and 45 degrees, and the range between 25 degrees and 35 degrees.

3. The separator tank according to claim 1, wherein the angle between the wall of the vertical tank and the protruding conical frusta shaped wall is 30 degrees.

4. The separator tank according to claim 1, further comprising a means for gas injection.

5. The separator tank according to claim 4, wherein the means for gas injection is provided in the tangentially arranged inlet.

6. The separator tank according to claim 4, wherein a gas source for the means for gas injection is a gas zone in the upper part of the separator tank.

7. The separator tank according to claim 6, wherein the gas zone in the upper part of the separator tank is the sole gas source for the means for gas injection.

8. The separator tank according to claim 6, wherein a conduit from the gas zone in the upper part of the tank is connected to an eductor in the inlet to the same tank.

9. The separator tank according to claim 8, wherein the conduit from the gas zone in the upper part of the tank is in open direct flow connection with the eductor in the inlet to the same tank, during operation of the tank.

10. The separator tank according to claim 1, wherein the helical spiralling vane has at least two 360 degree twists.

11. The separator tank according to claim 1, wherein the helical spiralling vane has a width in the range from 5 cm to 15 cm.

12. The separator tank according to claim 1, wherein the tank has at least one third outlet for oil and gas located in the tank wall below a protrusion of the protruding conical frusta shaped wall.

13. The separator tank according to claim 12, wherein the third outlet is connected to the upper part of the tank.

14. The separator tank according to claim 1, further comprising a means for providing an upward vortex flow in the lower part of the tank.

15. The separator tank according to claim 14, wherein said means for providing an upward vortex flow includes at least one baffle.

16. The separator tank according to claim 1, wherein said at least one first outlet is for oil and gas.

17. The separator tank according to claim 16, wherein said at least one second outlet is for water.

18. The separator tank according to claim 1, wherein said at least one second outlet is for water.

19. A method for separating a fluid including water, oil and gas comprising the steps of:
   a) feeding the fluid containing water, oil and gas to be treated into a tangentially arranged inlet of a first separator tank according to claim 1; thereby causing fluid flow into a lower part of the tank via a downward protruding conical frusta shaped wall with a helical spiralling vane,
   b) taking out a stream of oil and gas from at least one first outlet of the first tank, and subjecting said stream of oil and gas to a further separation in a second separation tank according to claim 1 to obtain an oil stream through at least one second outlet of the second tank and a first gas stream through at least one first outlet of the second tank;
   c) taking out a first stream of water from said at least one second outlet of the first tank, and feeding said stream of water through a tangentially arranged inlet to a third tank according to claim 1 thereby causing fluid flow into a lower part of the tank via a downward protruding conical frusta shaped wall with a helical spiralling vane, and
   d) taking out a stream of cleaned water through at least one second outlet of the third tank.

20. The method according to claim 19, wherein liquid in at least one of said first tank and said second tank and said third tank is subjected to gas injection.

21. The method according to claim 20, wherein the gas injection is performed in the inlet to the tank upstream of the inlet opening to the tank.

22. A separator tank comprising an essentially cylindrical vertical tank, a tangentially arranged inlet in an upper part of the tank, at least one first outlet in the upper part of the tank, at least one second outlet in a lower part of the tank, and a vortex zone located below the tangentially arranged inlet and above the outlet for water, wherein said vortex zone comprises a downward protruding conical frusta shaped wall dividing the tank into said upper part and said lower part and having an opening at the lower end of said downward protruding conical frusta shaped wall to allow communication between the upper and lower part of the tank, and a helical spiralling vane disposed at and secured to the upward directed part of said conical frusta shaped wall.

23. The separator tank according to claim 22, wherein the separator tank includes a means for establishing a calm flow around the second outlet and wherein the means for establishing a calm flow around the second outlet is one of a disc with a circular circumference, a horizontally placed disc, a conical member, and a hemispherical shaped member.

24. The separator tank according to claim 22, wherein the separator tank includes a gas injection means at the tangentially arranged inlet.

25. The separator tank according to claim 24, wherein the gas injection means is one of an eductor, a gas and fluid mixing device, an injection nozzle, a ring shaped injection nozzle, injection nozzles, and ring shaped injection nozzles.

26. The separator tank according to claim 22, wherein a lower side of said downward protruding conical frusta shaped wall has a guiding plate.

* * * * *